March 28, 1967 G. E. LA PORTE ET AL 3,310,868
METHOD OF MAKING RADIATORS
Filed May 4, 1964 2 Sheets-Sheet 1

INVENTOR.
Gerald E. Laporte
Joseph D. Lear
William L. Whitcher
BY
Joseph D. Lear
Atty.

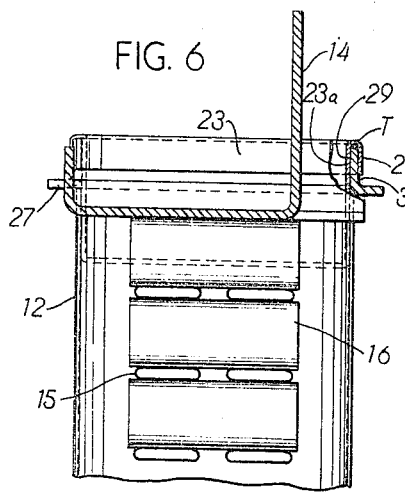
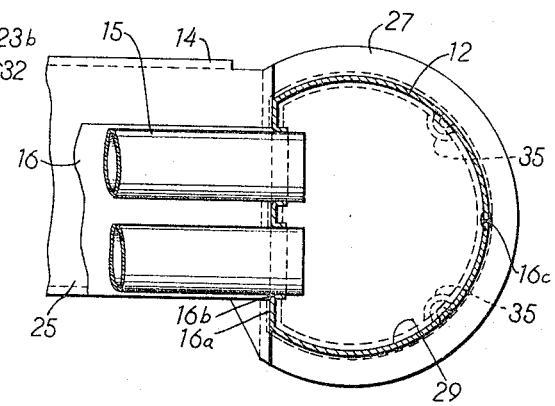
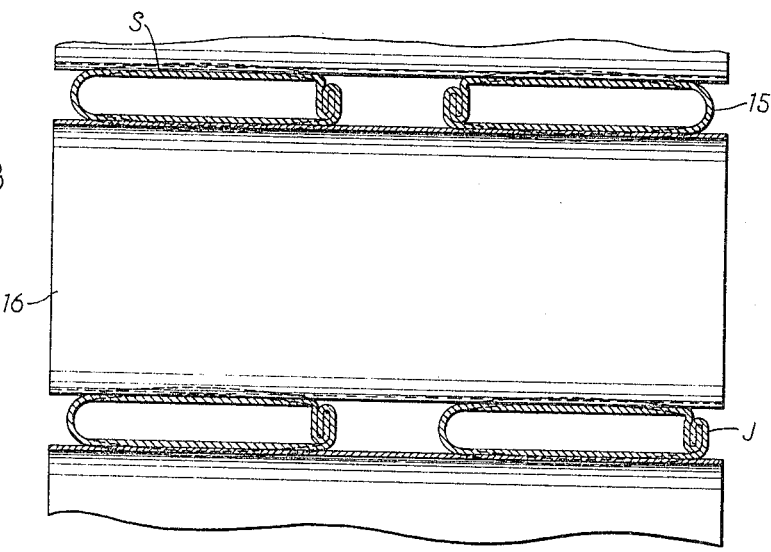
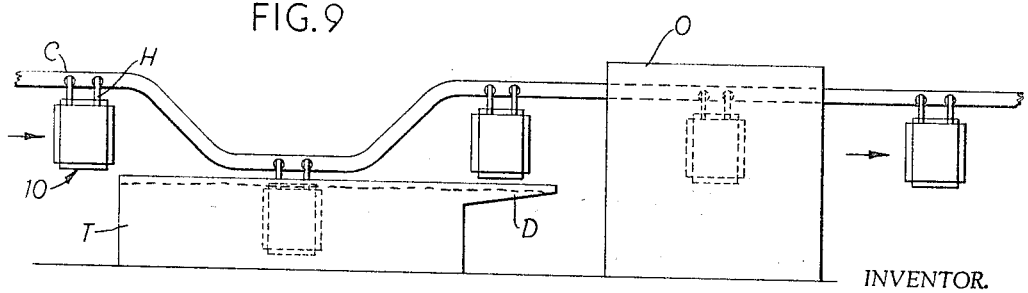

United States Patent Office 3,310,868
Patented Mar. 28, 1967

3,310,868
METHOD OF MAKING RADIATORS
Gerald E. La Porte, Buffalo, Joseph D. Lear, Snyder, and William C. Whitcher, Kenmore, N.Y., assignors to Fedders Corporation, Edison, N.J.
Filed May 4, 1964, Ser. No. 364,415
1 Claim. (Cl. 29—157.3)

This invention relates to improvements in the structure and method of manufacture of automotive radiators, car heaters and similar heat exchange devices.

In our U.S. Patent 3,246,691, there is disclosed a cellular-tubular type of radiator where the components are so related structurally that the unit may be integrated in a single baking or solder melting operation with a minimum of handling and jigging. It is proposed in the present invention to improve on this conception by devising a method of pre-stressing the radiator including the core mass by the sidewalls of the radiator unit which are devised as springs to compress the core mass at a constant rate. Thus, during the solder melting and cooling operation, the parts, particularly the tube and fin assembly, are continuously urged into contact to provide excellent solder bonding characteristics, totally unaffected by dimensional diminution and expansion and contraction experienced in the heating and cooling cycle.

Other features of the invention are more specifically set forth in the accompanying specification and drawings wherein;

FIG. 6 is an enlarged section on the line 6—6 of FIG. 4.

FIG. 7 is an enlarged section on the line 7—7 of FIG. 4.

FIG. 8 is an enlargement of a portion of the cross section of FIG. 6.

FIG. 9 is a diagrammatic view showing the radiator unit during the process of fluxing, baking and cooling.

Figure 1:
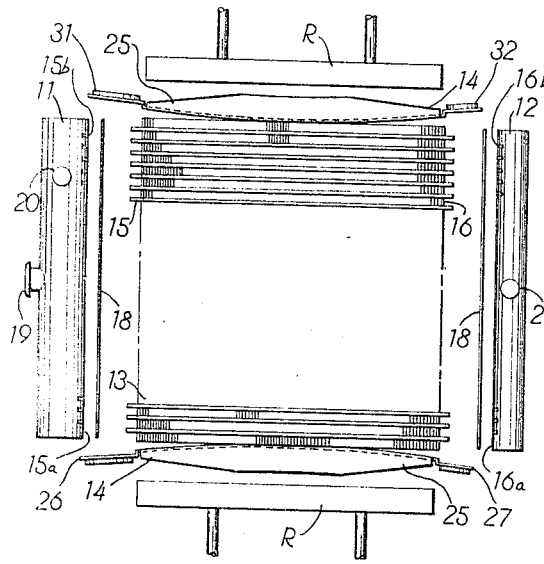
FIG. 1 is an exploded elevational view showing the components of the radiator before assembly.

The radiator unit 10, wherein the method of the invention is applied, is preferably of the cellular-tubular type as disclosed in said U.S. Patent No. 3,246,691. This unit comprises of upper and lower tanks 11 and 12, respectively, and a core 13 between such tanks. Sidewalls 14 are located on the remaining sides of the core and engage the ends of the tanks 11 and 12. The core 13 is most advantageously of the cellular-tubular type, and consisting of rows of parallel solder coated tubes 15 held in spaced relation by zig-zag fins 16. The tubes 15 are of the familiar flattened type having interlocking joints J on their ends and slightly convex sides S (FIG. 8). The tanks 11 and 12 as best seen in FIG. 7 are of sheet metal having flat header areas 15a and 16a, respectively, containing similar rows of flanged openings 15b and 16b for receiving snugly the ends of the tubes 15. Solder sheets 18 are suitably punched to permit their disposal over the tube ends before the tubes are entered into the openings 15b and 16b of the tanks.

The tanks 11 and 12, except for the header areas 15a and 16a, are cylindrical in cross section. In FIG. 7, the tank 12 is shown as having a longitudinal joint 16c, which may take the form of a butt braze or other conventional joint. The tank 11, which is similar to tank 12, except for cross-sectional proportions is supplied with a similar joint (not shown). Filler and inlet fittings 19 and 20 are secured in the tank 11 while an outlet fitting 21 is similarly secured in the tank 12. The open ends of the tanks 11 and 12 are sealed by caps 22 and 23, respectively. Such caps having cup-like body portions 22a and 23a fitting snugly within the ends of their respective tanks. In FIG. 6 the cap 23 is formed with a U-shaped peripheral flange 23b which receives a solder insert T. The cap 22 is similarly formed to receive an insert T (not shown).

The sidewalls 14 have a central channel shaped body portion 25 and terminals 26 and 27 containing flanged apertures 28 and 29, respectively, outlined by continuous flanges 31 and 32 which fit snugly about the extremities of their respective tanks. It will be observed in FIG. 6 that the U-shaped flange 23b of the cap 23 extends about the exterior of the flange 32 of its associate sidewall 14.

Figure 2:
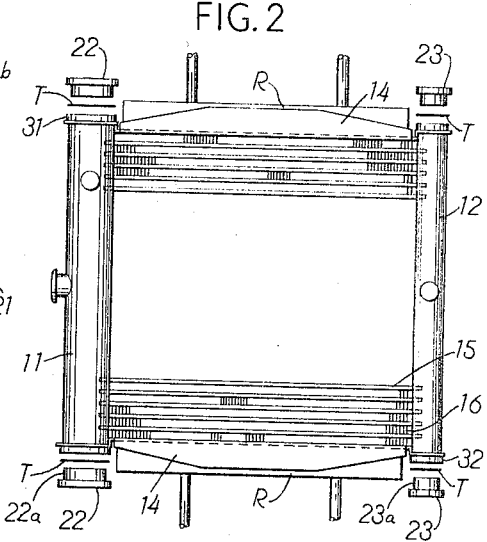
FIG. 2 is a similar view showing the parts being brought together into assembly.

In the method of assembling the radiator unit 10 of the type described, the tubes and fins 15 and 16 are first stacked one upon the other to form a rectilinear core mass 13 with the extremities of the tubes protruding in orderly arrangement (FIG. 1). The core mass is then compressed by rams R acting directly on the sidewalls 14 to bring the core to the desired dimension, and, while under compression, the solder sheets 18 are disposed over the tube end and the tanks 11 and 12 are then entered upon the ends of the tubes. With the core thus held in its compressed position, the caps 22 and 23 are now entered through the sidewalls and into the tank extremities with their U-shaped flanges engaging about the flanges 31 and 32 of the sidewalls 14 (FIG. 2). The caps are now staked transversely as indicated by the numeral 35 (FIG. 7) so that the caps and tanks are in effect riveted together to prevent disassembly of the sidewalls against the spring pressure of the core mass. The rams are now backed off and the radiator unit appears, as shown in FIG. 3, as a complete self-sustaining assembly.

It will be observed in FIG. 1 that the sidewalls 14 are formed so that they are bowed inwardly toward each other in their disassembled form to provide in effect curved springs. For purposes of illustration, this curvature is greatly exaggerated in FIG. 1. It will be seen in FIG. 3 that when the sidewalls are utilized to compress the core mass, the opposing spring effects of the bulging core mass and the bowed sidewalls are neutralized, so that the sides of the core mass and the sidewall body portions 25 become slightly convex in their mutual contacts. At this point in the assembly, the sides S of the tubes 15 are each slightly compressed so that they are modified from their convex shape (dot and dash lines in FIG. 8) by the parallel configuration illustrated.

Figure 3:
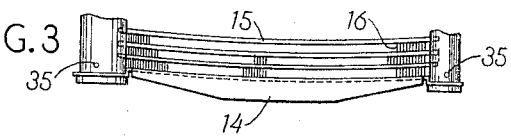
FIG. 3 is a fragmentary view showing the unit after assembly.

The completely assembled cores of FIG. 3 are now suspended on suitable hangers H on a conveyer C (FIG. 9) where each unit is first immersed in the flux in a tank T; removed from the tank to permit drainage of excess flux at Station D; and thence conveyed through an oven O, wherein a baking temperature of approximately 650° F. is maintained which is sufficient to heat the mass of the unit and to melt the various solder inserts and the solder on the coated tubes 15 to form adequate solder joints between the assembled parts.

Figure 4:
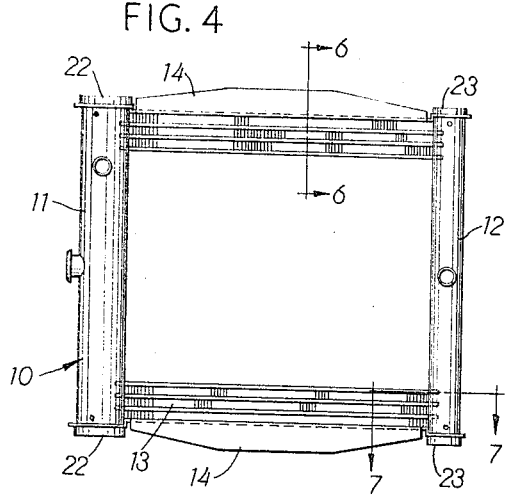
FIG. 4 is another similar view showing the finally assembled radiator.
Figure 5:
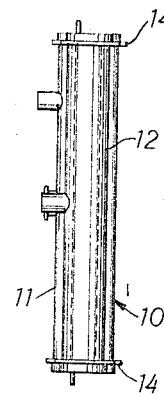
FIG. 5 is a side view of FIG. 4.

During the heating and cooling cycle above outlined, the melting of the solder on the tubes 15 results in the slight diminution of the lateral dimension of the slightly bowed core mass, and correspondingly in the lessening of the outward pressure of the core mass on the spring-like sidewalls. Under these circumstances, the sidewalls follow and constantly press upon the sides of the core mass until the core exits from the oven O and cools off. The finished radiator appears as in FIG. 4 where the contacting faces of the core mass with their respective sidewalls become substantially linear and the radiator is restored to the intended rectilinear formation. It will be seen that the pre-bowed sidewalls influence the core mass in a manner not before obtained so that soldering and cooling take place always under pressure regardless of local expansions or contractions in the core mass.

It will be apparent from the foregoing description that the principle of applying a constant pre-determined pressure on a core mass during the baking operation may be applied to other than the precise radiator herein illustrated and that numerous types and modifications of radiator structures may be used if desired within the scope of the appended claims, wherein we claim:

The method of assembling a cellular-tubular radiator, wherein the components include flattened solder coated tubes, zig-zag fins, a pair of concave resilient sidewalls, and inlet and outlet tanks including headers having spaced tube receiving apertures, which consists of the following steps:

first, in sub-assembling a core wherein said flattened solder coated tubes are spaced in parallel disposal by interposed zig-zag fins to form a flexible rectilinear core mass;

secondly, placing said sidewalls on the sides of the core mass and then compressing externally the assembled core mass and side walls during which the sidewalls are deformed from their concave shape to a lineal configuration;

third, applying said tanks to the ends of the compressed assembled core and sidewalls, wherein the ends of the tubes are entered in their respective apertures in the tank header;

fourth, attaching the sidewalls to said tanks wherein said sidewalls are of a configuration to retain the desired compressed condition after the external compressing forces are removed;

fifth, releasing the external compressing forces; and finally in fluxing and baking the unit to melt the solder to bond the assembly together.

References Cited by the Examiner
UNITED STATES PATENTS

| | | | |
|---|---|---|---|
| 2,252,211 | 8/1941 | Seemiller | 29—147.3 X |
| 2,573,161 | 10/1951 | Tadewald | 29—147.3 X |
| 2,794,243 | 6/1957 | Schweller | 29—157.3 |
| 3,246,691 | 4/1966 | La Ponte et al. | 165—151 |

JOHN F. CAMPBELL, *Primary Examiner.*

J. D. HOBART, *Assistant Examiner.*